United States Patent [19]
Knowler

[11] Patent Number: 4,615,499
[45] Date of Patent: Oct. 7, 1986

[54] WING SLAT ANTI-ICE AIR DUCT SYSTEM
[75] Inventor: John C. Knowler, Renton, Wash.
[73] Assignee: The Boeing Company, Seattle, Wash.
[21] Appl. No.: 522,495
[22] Filed: Aug. 12, 1983
[51] Int. Cl.$^4$ ............................................. B64D 15/04
[52] U.S. Cl. ................................ 244/134 B; 244/207; 244/214
[58] Field of Search ..................... 244/134 B, 207, 214, 244/134 R, 134 C; 138/28, 113, 114, 120; 308/3 S, 4 R; 285/298, 302

[56] References Cited
U.S. PATENT DOCUMENTS 2,829,930  4/1958  Beach ................................. 308/4 R
3,691,588  9/1972  Hennig et al. ...................... 308/3.5
3,917,193  11/1975 Runnels, Jr. .................... 244/134 B

FOREIGN PATENT DOCUMENTS 746714  11/1944  Fed. Rep. of Germany ...... 244/214
529730  8/1977   U.S.S.R. .......................... 244/134 B Primary Examiner—Trygve M. Blix
Assistant Examiner—Rodney Corl
Attorney, Agent, or Firm—Christensen, O'Connor, Johnson & Kindness

[57] ABSTRACT

An anti-icing pressurized air distribution duct system for deployable wing slats wherein mutually telescoping transfer ducts interconnecting a longitudinal wing slat spray duct and a longitudinal wing supply duct, with bearing and seal means fixed on the inner transfer duct to bear slidably against the outer duct interior and remaining protected within the outer duct throughout slat extension and retraction.

3 Claims, 4 Drawing Figures

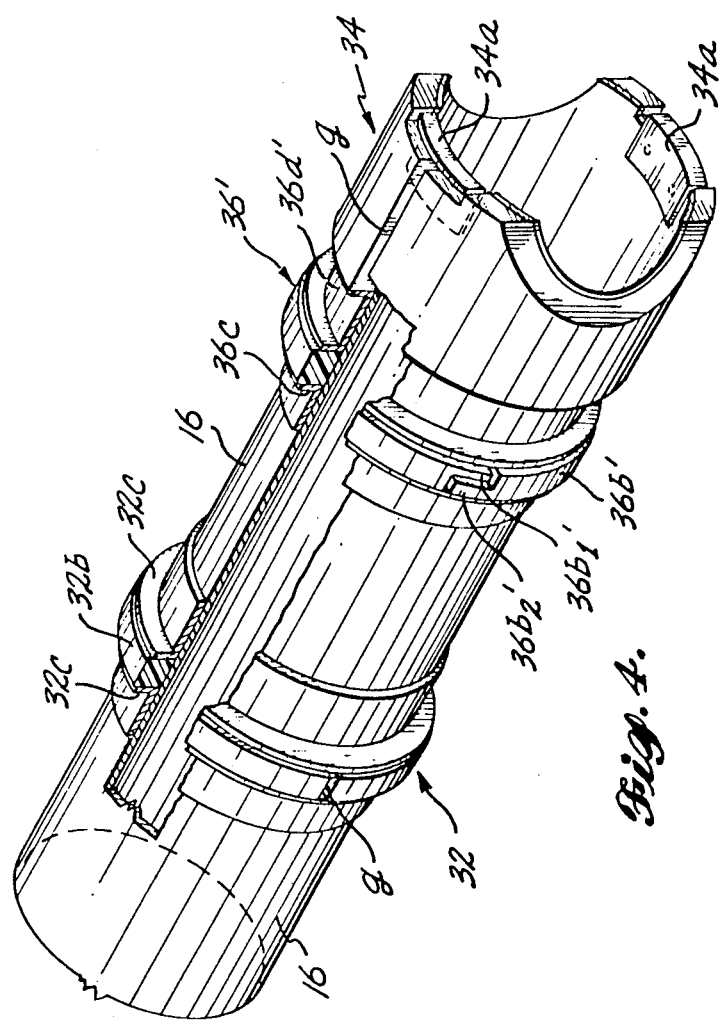

WING SLAT ANTI-ICE AIR DUCT SYSTEM

BACKGROUND OF THE INVENTION

This invention relates to improved pressurized ducting systems for delivery of anti-ice air to aircraft leading edge slats actuated to move between retracted, stowed position and extended, operating position. The improved ducting system is herein illustratively described by reference to the presently preferred embodiment thereof, but it will be recognized that certain modifications and changes therein with respect to details may be made without departing from the essential features involved.

Problems experienced with existing ducting systems for delivering anti-ice air to leading edge slats arise primarily in the transfer ducting, that is, in the sets of telescoping inner and outer ducts that transfer pressurized warm air from the supply duct running lengthwise in the wing's leading edge to the spray ducts running lengthwise in the deployable slats and having openings through which warm air is delivered to the interior surface of the slat. When extended, the inner transfer duct of each set is exposed to rain and slush, and with the metal below freezing temperature, tends to accumulate a buildup of ice. It also tends to accumulate dirt and sometimes particles of metal which cause wear of bearings and seals, and which can be picked up by the bearing surfaces to causing galling of duct surfaces. In fact, at times ice accumulation can become so thick as to impede or even cause buckling of the thin-wall (essentially sheet metal) inner and outer ducts during slat retraction. Also, wear of bearing surfaces over a period of time and lateral loading on the telescoping transfer ducts during slat retraction, such as caused, for example, by slat movements during flight, can impede smooth retraction and can generate buckling stresses in the transfer ducts. These problems became chronic with prior flow transfer duct apparatus. Strengthening the tubes adds both cost and weight and alone was not a full solution.

The present invention is directed toward overcoming these problems and limitations without adding materially to cost and weight of the ducting system. More specifically, it is an object here to protect the slide bearings and seal means in a simple and reliable duct construction more durable, wear-free and failure-proof duct than the prior means for transferring anti-ice air from a supply duct in the wing to a spray duct in the slat. In so doing, the invention provides an improved bearing and seal arrangement for the telescoping transfer ducts which will assure their self-alignment under all ambient conditions and operating conditions.

SUMMARY OF THE INVENTION

In accordance with the present invention achieving these objectives, the slide bearing means and the slide seal means are mounted on the inner of the telescoping ducts and at all times retained within the outer duct rather than continuing with former arrangements under which they were placed on the outer such duct, and required to slide upon the inner duct in whatever surface condition it might present during retraction movement. As will appear, the greatly improved system imposes little or no added cost and no appreciable added weight. Preferably, the annular slide bearings mounted on the inner duct comprise discrete bearing elements, one mounted on the innermost or free end of the inner duct, and the other mounted on the inner duct at such a spacing from the first as to lie just inside the end of the outer duct with the slat in its fully deployed position. Maximum stiffness of the telescoping ducts in all positions is achieved by maximizing the bearing spacing and maintaining the described protection of the slide bearings and outer duct interior under all operating conditions and positions of the slat. The sliding air seal means, also mounted on the inner duct, is located between the slide bearings and is not only thereby afforded maximum environment protection, but is also spared the imposition of bearing loads and can thereby be designed for maximum life and effectiveness as an air seal preventing escape of warm pressurized anti-icing air into the atmosphere. The outer duct, always protectively surrounding the length portion of the inner duct carrying the slide bearings and seal means limits entry of dirt, metal particles and moisture, and should ice accumulate on the exposed inner duct in its extended postion, retraction movement telescoping the two ducts together will cause the reinforced end of the outer duct to shear off excess ice and prevent its scraping against the interior wall of the outer duct or causing binding and buckling of the ducts during slat retraction.

BRIEF DESCRIPTION OF THE DRAWINGS

FIG. 4 is a perspective view of a portion of the inner duct illustrating the slide bearings and modified seal means in the presently preferred form.

DETAILED DESCRIPTION

Figure 1:
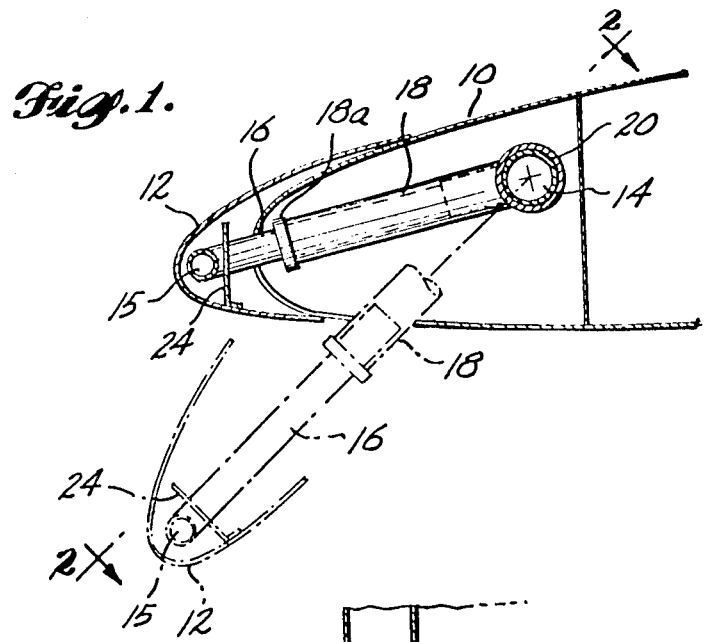
FIG. 1 is a simplified sectional face view of a wing leading edge portion with deployable slat and associated anti-ice ducting, the view showing the slat retracted, and by dotted lines the slat extended.
Figure 2:
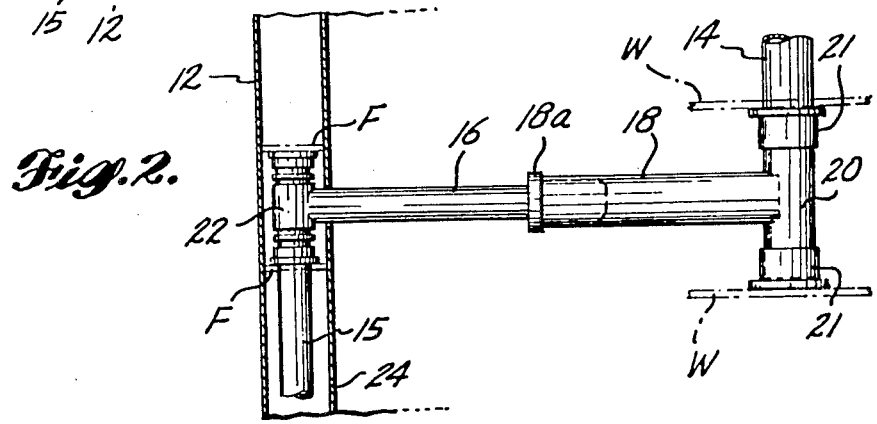
FIG. 2 is a simplified sectional view taken on line 2—2 of FIG. 1 showing a portion of the duct system to include the transfer ducts (with slat extended)

As shown, slat 12 on wing 10 is normally retracted to nest against the wing's leading edge (FIG. 1) when in high-altitude flight and is deployed by suitable drive mechanism (not shown) into the illustrated broken-line position for take-offs and landings. Heated anti-icing air is conducted to a suitable transfer point on the wing's leading edge by supply duct 14 and is conducted to a spray duct 15 extending lengthwise in the slat through a set of mutually telescoping transfer ducts 16 and 18 by way of rotative short connector ducts or couplers permitting the mutually telescoping transfer ducts to swing both about the axis of supply duct 14 and about the axis of spray duct 16. Deployment and retraction of slat 12 requires both such motions as well as telesopic lengthening and shortening of the coaxial ducts 16 and 18. To this end, rotative coupler 20 interconnects supply duct 14 with outer transfer duct 18 and rotative coupler 22 interconnects spray duct 15 with inner transfer duct 16. Supply duct 14 and spray duct 15 do not rotate. Rotative coupler 20 is rotatively mounted, with associated air seals, in annular support bearings 21 on structural wing webs W. Rotative coupler 22 is rotatively mounted in annular spport bearings 23 (with associated annular air sealing means 23a sealing the coupler at one end to the spray duct 15) mounted on structural web plates F in the slat. Thus, air is directed to flow into the spray duct 15 in all positions of the transfer ducts. During swinging motion accompanying extension and retraction of the telescoping transfer ducts 16 and 18, these combine to form a relatively stiff and straight lever arm which causes attendant rotation of the connectors 20 and 22 as the slat is moved in and out. Typically, these ducts are of thin-wall or sheet metal construction, usually about 3 inches in diameter, and must therefore be protected against wear, misalignments and lateral deflections which can cause buckling during slat retraction.

In the preferred construction, inner duct 16 supports its outermost slide bearing 32 in the described position intermediate the ends of duct 16. The slide bearing pad itself comprises a split ring 32b of suitable material having a low coefficient of friction and capable of withstanding the extreme temperature variations likely to be encountered during flight. Slidably engaging and pressing outward against the interior wall of the outer duct 18, ring 32b is held in place longitudinally of the inner duct between two flanged collars 32c mounted on the inner duct which permit the ring to expand and contract with change of temperature. Preferably, this split ring is made of teflon-impregnated polyimide material, although other suitable materials may also be used.

The innermost slide bearing 34 is mounted with maximum spacing from bearing 32 to maximize stiffness of the telescoping ducts against lateral misalignment forces. To this end, it is mounted on the inner or free end of the inner duct. It also comprises a split ring 34b wider than ring 32b, with arcuately concave end cuts at opposite sides to avoid interference with the supply duct 14 and to avoid impeding airflow into duct 16 from the coupler with the inner duct in its most retracted position in the outer duct. Retainer clips 34a fastened to the interior of the duct wall at the ends and turned outwardly into end notches in slide bearing ring 34b hold the ring against slipping off the end of the inner duct and against rotation. One ring flange of an annular channel 36d retains the split ring 34a against movement in the opposite direction on the inner duct. Flexibility of the split bearing rings 32b and 34b is sufficient to allow their expansion so as to slip them over the retaining elements which hold them in place. Each ring's gap g is sufficient to allow for thermal growth of the ring relative to duct diameters.

Figure 3:
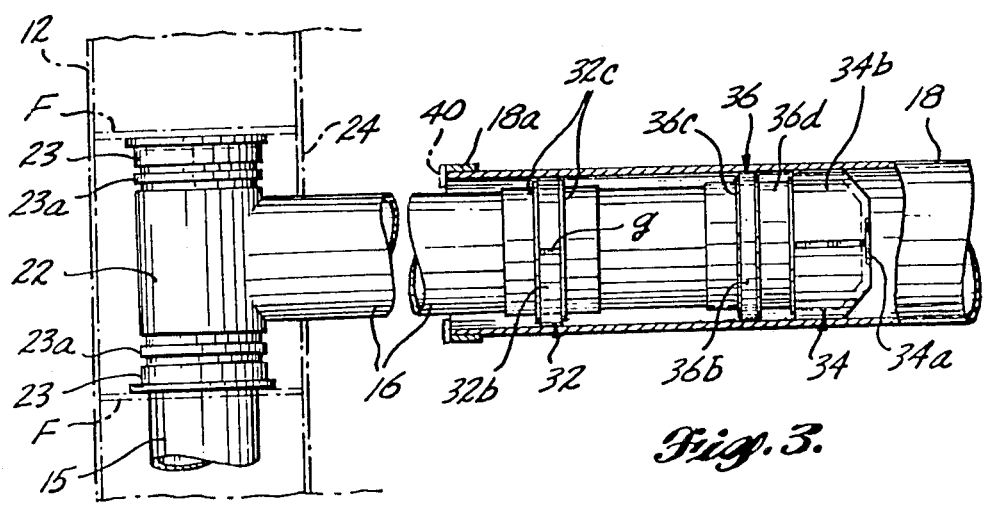
FIG. 3 is an enlarged face view of the duct system with further details of the transfer duct means illustrated.

Annular air seal 36 is likewise retained in position between a flange of channel 36d and a flanged collar 36c mounted on duct 16. Seal 36 is thus protectively located between the slide bearings 32 and 34 and preferably is located closely adjacent the inner bearing 34 for construction convenience and to a lesser degree for maximum environmental protection. As previously stated, its positioning between the load-carrying slide bearings 32 and 34 assures that seal 36 is not subjected to bearing load and wear, so that it may be designed for maximum effectiveness as an air seal between the telescoping ducts. It is preferably made of a suitable flexible synthetic semi-elastomeric material with low coefficient of friction. If desired, it may be made of the same material as the slide bearing rings. However, in this instance (FIG. 3) it is designed as a collar of U-shaped cross-section with one side of the U pressing resiliently outward against the inside wall of the outer duct 18 and the opposite side of the U pressing inwardly against the duct 16. The seal is sufficiently elastic that it can be slipped into mounted position between its retainer flanges, thereby simplifying assembly of parts.

In the modified form of air seal shown in FIG. 4, a split ring is used with ends 36b'1 and 36b'2 of reduced width and overlapping each other to form a labrynthal flow impeding passage while also providing the advantages of a split ring as the seal member.

Outer transfer duct 18 has a stiffener band 18a encircling its free end to provide dimensional stability and prevent damage of the end during shipment or handling. Also, if ice accumulates on the inner transfer duct 16 beyond the radial limit of the interior of duct 18, the same will be removed by the reinforced end of the outer transferred duct 18/18a in the process of retracting the slat and shortening the telescoping transfer duct 16/18. If desired, as shown by dotted lines, an added collar fitting serving as an ice shear 40 may be mounted on the free end of outer duct 18 in order to shear off ice accumulations on the inner duct to a diameter slightly smaller than the interior diameter of outer duct 18 in order to ensure clearance from the latter during slat retraction.

In operation, deployment of slat 12 into its lowered, declined position depicted in FIG. 1 is attended by downward swinging and lengthening of transfer duct 16/18. In so doing, inner transfer duct 16/18 becomes exposed to rain water, slush and dirt. Ice may form on it if the duct metal is at or below the freezing point. When the slat is once again retracted during or after completion of the landing run, shortening of the transfer duct by telescoping sliding action of the inner duct's bearings 32 and 34 and of its seal 36 along the protected interior of outer duct 18 is smooth and unobstructed by ice and dirt, as desired.

The claims that follow are intended to cover the novel disclosed combination and its equivalent variant forms.

The embodiments of the invention in which an exclusive property or privilege is claimed are defined as follows:

1. Anti-icing duct means for aircraft retractable/deployable wing slats wherein the leading edge of a wing houses a longitudinal main supply duct carrying pressurized anti-icing air and the leading edge of a wing slat houses a longitudinal spray duct for distributing anti-icing air against the slat, the duct means comprising:
    (a) transfer ducts extending between the supply duct and the spray duct to continuously interconnect the supply duct to the spray duct throughout deployment and retraction of the wing slats, the transfer ducts including:
        (i) a thin wall inner duct having one end connected to the spray duct for rotation of the inner duct about the spray duct, the other end of said inner duct forming a mating end that extends toward the supply duct;
        (ii) a thin wall outer duct having one end connected to the supply duct for rotation of the outer duct about the supply duct, the other end of said outer duct forming a mating end that extends toward the spray duct, the mating end of the inner duct being telescopically engaged within the mating end of the outer duct, one portion of the mating end of the inner duct telescoping out of the outer duct during the deployment of said wing slat, another portion of the mating end of the inner duct remaining within the outer duct throughout deployment and retraction of the wing slat;

(iii) slide bearing means fixedly mounted on the exterior of the thin wall inner duct along the portion thereof that remains within the outer duct throughout the retraction and deployment of said wing slat, said slide bearing means slidably engaging the interior wall of the thin wall outer duct and providing support between the inner and outer ducts along a substantial part of the portion of the mating end of the inner duct that remains within the outer duct throughout deployment and retraction of the wing slat; and, (iv) seal means fixedly mounted on the exterior of the thin wall inner duct along the portion thereof that remains within the outer duct throughout the retraction and deployment of said wing slat, said seal means slidably engaging the interior wall of the thin wall outer duct and providing a seal between the inner and outer ducts throughout deployment and retraction of the wing slat.

2. The anti-icing duct means defined in claim 1, including an edge reinforcing means extending around the tip of the mating end of the thin wall outer duct.

3. The anti-icing duct means defined in claim 2, wherein the reinforcing means comprises an annular member extending beyond the end of the duct and having an inner diameter less than the interior diameter of the outer duct, thereby to shear off ice accumulations for clearance thereof from the outer duct interior wall.

* * * * *